Vincent & Northrup,
Hobby Horse.
N° 33,552.     Fig. 1.     Patented Oct. 22, 1861.
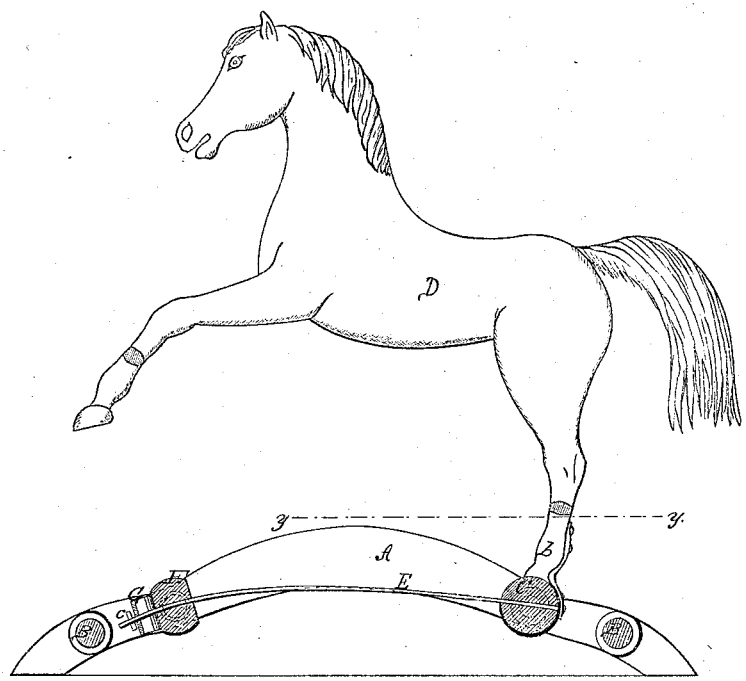
Fig. 2.
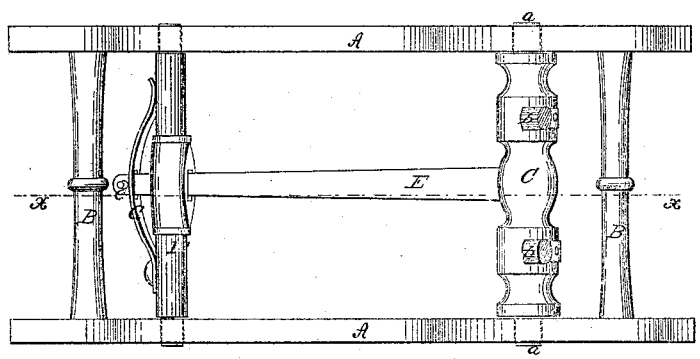
Witnesses:
James Laird
Richardson
Inventors:
William E. Vincent
Chauncey B. Northrup

UNITED STATES PATENT OFFICE.

WILLIAM E. VINCENT AND CHAUNCEY B. NORTHRUP, OF NEW YORK, N. Y.

IMPROVEMENT IN SPRING ROCKING-HORSES.

Specification forming part of Letters Patent No. 33,552, dated October 22, 1861.

*To all whom it may concern:*

Be it known that we, WILLIAM E. VINCENT and CHAUNCEY B. NORTHRUP, both of the city, county, and State of New York, have invented a new and useful Improvement in Spring Rocking-Horses for Children's Use; and we do hereby declare that the following is a full, clear, and exact description of the same, reference being had to the annexed drawings, making a part of this specification, in which—

Figure 1 is a side sectional view of our invention taken, in the line $x$ $x$ of Fig. 2, and Fig. 2 a horizontal section of the same, taken in the line $y$ $y$ of Fig. 1.

Similar letters of reference indicate corresponding parts in the two figures.

The object of this invention is to simplify and economize in the construction of spring rocking-horses and render the same far more durable and efficient than those previously constructed.

The invention consists in a novel application of a flat spring and check, substantially as herein shown and described, whereby the ordinary coiled or flat wound springs are avoided and the desired end fully attained.

The coiled or flat wound springs, as is well known to those skilled in the art, are liable to break or lose their elasticity on account of imperfect tempering, it being impossible to properly temper a coil-spring with any degree of accuracy.

To enable those skilled in the art to fully understand and construct our invention, we will proceed to describe it.

A A represent two parallel bars, which are connected by traverse-rods B B, and C is a shaft, the journals $a$ of which are fitted in the bars A A and allowed to turn freely therein. To the shaft C the hind legs $b$ $b$ of a wooden or toy horse D are permanently attached, the horse being in a galloping position, as shown clearly in Fig. 1.

To the shaft C there is secured the back end of a spring E. This spring is of flat form, and its front end passes through a shaft F, the journals of which are fitted and turn loosely in the bars A A. The front end of the spring E passes through the center of a spring G, which is attached to the front side of the shaft F, and a pin $c$ passes vertically through the spring E at the outer side of spring G, as shown clearly in both figures. The spring E serves to vibrate the horse when the rider is upon it, and the spring G serves as a check to prevent the horse from rocking too far back. The strength of spring E should of course be proportionate to the size or weight of the horse and its rider, so as to form an equipoise and admit of an agreeable and easy vibration of the horse with but little exertion on the part of the rider.

The springs E G, it will be seen, may be readily tempered and in a very perfect manner—in fact, equally as well as a knife-blade or other flat article of steel. Coil or wound springs cannot be perfectly tempered, as their surfaces cannot be placed wholly in contact with a hot reducing-surface, and they are therefore simply heated to a certain degree and plunged into water or oil. This mode of tempering is very imperfect, and some springs are very hard and break easily, while others are too soft and soon lose their elasticity. In order to temper steel properly, it should be made as hard as possible by bringing it to a high heat or temperature and then suddenly plunging it in water or oil. The hardened steel is then reduced to a proper temper by placing it in contact with hot metal. Coil-springs, it will at once be seen, cannot be operated upon in this way, as their coiled or wound form precludes the possibility of placing them in contact with a heated surface for the purpose of graduating their temper.

We do not claim, broadly, or irrespective of construction and arrangement, the connecting of a spring or springs to a toy rocking-horse for the purpose of vibrating the same by a slight exertion of the rider; but We do claim as new and desire to secure by Letters Patent—

The combination of the flat spring E with the check-spring G, arranged and applied to the horse substantially as and for the purpose set forth.

WILLIAM E. VINCENT.
CHAUNCEY B. NORTHRUP.

Witnesses:
RICHARDSON GAWLEY,
JAMES LAIRD.